United States Patent [19]
Panwar et al.

[11] Patent Number: 6,085,305
[45] Date of Patent: *Jul. 4, 2000

[54] APPARATUS FOR PRECISE ARCHITECTURAL UPDATE IN AN OUT-OF-ORDER PROCESSOR

[75] Inventors: Ramesh Panwar, Santa Clara; Arjun Prabhu, Palo Alto, both of Calif.

[73] Assignee: Sun Microsystems, Inc., Palo Alto, Calif.

[*] Notice: This patent is subject to a terminal disclaimer.

[21] Appl. No.: 08/881,729

[22] Filed: Jun. 25, 1997

[51] Int. Cl.[7] .................................................. G06F 15/82
[52] U.S. Cl. ................................. 712/23; 712/2; 712/4; 712/205; 712/215
[58] Field of Search ..................... 395/800.32, 800.23, 395/800.25, 800.26, 800.27, 800.1, 800.11, 381, 392, 390, 561, 590, 595; 712/32, 23, 25, 26, 27, 1, 2, 4, 205, 215, 216, 220, 234

[56] References Cited

U.S. PATENT DOCUMENTS

| | | | |
|---|---|---|---|
| 5,134,561 | 7/1992 | Liptay | 395/425 |
| 5,421,020 | 5/1995 | Levitan | 712/237 |
| 5,454,117 | 9/1995 | Puziol et al. | 395/800 |
| 5,463,745 | 10/1995 | Vidwans et al. | 395/375 |
| 5,511,172 | 4/1996 | Mimura et al. | 395/582 |
| 5,519,841 | 5/1996 | Sager et al. | 395/412 |
| 5,553,255 | 9/1996 | Jain et al. | 712/235 |
| 5,708,841 | 1/1998 | Popescu et al. | 712/23 |
| 5,740,419 | 4/1998 | Potter | 712/241 |
| 5,765,016 | 6/1998 | Walker | 712/23 |
| 5,778,245 | 7/1998 | Papworth et al. | 395/800.23 |
| 5,838,988 | 11/1998 | Panwar et al. | 395/800.32 |

*Primary Examiner*—Meng-Ait. An
*Assistant Examiner*—Dzung C. Nguyen
*Attorney, Agent, or Firm*—William J. Kubida; Stuart T. Langley; Hogan & Hartson LLP

[57] ABSTRACT

A processor including at least one execution unit generating out-of-order results and out-of-order condition codes. Precise architectural state of the processor is maintained by providing a results buffer having a number of slots and providing a condition code buffer having the same number of slots as the results buffer, each slot in the condition code buffer in one-to-one correspondence with a slot in the results buffer. Each live instruction in the processor is assigned a slot in the results buffer and the condition code buffer. Each speculative result produced by the execution units is stored in the assigned slot in the results buffer. When an instruction is retired, the results for that instruction are transferred to an architectural result register and any condition codes generated by that instruction are transferred to an architectural condition code register.

10 Claims, 6 Drawing Sheets

APPARATUS FOR PRECISE ARCHITECTURAL UPDATE IN AN OUT-OF-ORDER PROCESSOR

The subject matter of the present application is related to that of co-pending U.S. patent application Ser. No. 08/881,958 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,730 now U.S. Pat. No. 5,958,047 for A METHOD FOR PRECISE ARCHITECTURAL UPDATE IN AN OUT-OF-ORDER PROCESSOR filed concurrently herewith by Ramesh Panwar and Arjun Prabhu; Ser. No. 08/881,726 now U.S. Pat. No. 5,987,594 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173 now U.S. Pat. No. 5,909,931 for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,145 for APPARATUS FOR DYNAMICALLY RECONFIGURING A PROCESSOR filed concurrently herewith by Ramesh Panwar and Ricky C. Hetherington; Ser. No. 08/881,732 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 for APPARATUS FOR TRACKING PIPELINE RESOURCES IN A SUPERSCALAR PROCESSOR filed concurrently herewith by Ramesh Panwar; Ser. No. 08/882,525 for AN APPARATUS FOR RESTRAINING OVEREAGER LOAD BOOSTING IN AN OUT-OF-ORDER MACHINE filed concurrently herewith by Ramesh Panwar and Ricky C. Hetherington; Ser. No. 08/882,220 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 for NON-BLOCKING HIERARCHICAL CACHE THROTTLE filed concurrently herewith by Ricky C. Hetherington and Thomas M. Wicki; Ser. No. 08/881,727 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 now U.S. Pat. No. 5,948,106 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

The present invention relates in general to microprocessors and, more particularly, to a system, method, and microprocessor architecture providing precise state updates in an out-of-order machine.

2. Relevant Background

Early computer processors (also called microprocessors) included a central processing unit or instruction execution unit that executed only one instruction at a time. As used herein the term processor includes complex instruction set computers (CISC), reduced instruction set computers (RISC) and hybrids. In response to the need for improved performance several techniques have been used to extend the capabilities of these early processors including pipelining, superpipelining, superscaling, speculative instruction execution, and out-of-order instruction execution.

Pipelined architectures break the execution of instructions into a number of stages where each stage corresponds to one step in the execution of the instruction. Pipelined designs increase the rate at which instructions can be executed by allowing a new instruction to begin execution before a previous instruction is finished executing. Pipelined architectures have been extended to "superpipelined" or "extended pipeline" architectures where each execution pipeline is broken down into even smaller stages (i.e., microinstruction granularity is increased). Superpipelining increases the number of instructions that can be executed in the pipeline at any given time.

"Superscalar" processors generally refer to a class of microprocessor architectures that include multiple pipelines that process instructions in parallel. Superscalar processors typically execute more than one instruction per clock cycle, on average. Superscalar processors allow parallel instruction execution in two or more instruction execution pipelines. The number of instructions that may be processed is increased due to parallel execution. Each of the execution pipelines may have differing number of stages. Some of the pipelines may be optimized for specialized functions such as integer operations or floating point operations, and in some cases execution pipelines are optimized for processing graphic, multimedia, or complex math instructions.

The goal of superscalar and superpipeline processors is to execute multiple instructions per cycle (IPC). Instruction-level parallelism (ILP) available in programs can be exploited to realize this goal, however, this potential parallelism requires that instructions be dispatched for execution at a sufficient rate. Conditional branching instructions create a problem for instruction fetching because the instruction fetch unit (IFU) cannot know with certainty which instructions to fetch until the conditional branch instruction is resolved. Also, when a branch is detected, the target address of the instructions following the branch must be predicted to supply those instructions for execution.

Recent processor architectures use a branch prediction unit to predict the outcome of branch instructions allowing the fetch unit to fetch subsequent instructions according to the predicted outcome. Branch prediction techniques are known that can predict branch outcomes with greater than 95% accuracy. These instructions are "speculatively executed" to allow the processor to make forward progress during the time the branch instruction is resolved. When the prediction is correct, the results of the speculative execution can be used as correct results, greatly improving processor speed and efficiency. When the prediction is incorrect, the completely or partially executed instructions must be flushed from the processor and execution of the correct branch initiated.

Early processors executed instructions in an order determined by the compiled machine-language program running on the processor and so are referred to as "in-order" or "sequential" processors. In superscalar processors multiple pipelines can simultaneously process instructions only when there are no data dependencies between the instructions in each pipeline. Data dependencies cause one or more pipelines to "stall" waiting for the dependent data to become available. This is further complicated in superpipelined processors where, because many instructions exist simultaneously in each pipeline, the potential quantity of data dependencies is large. Hence, greater parallelism and higher performance are achieved by "out-of-order" processors that include multiple pipelines in which instructions are processed in parallel in any efficient order that takes advantage of opportunities for parallel processing that may be provided by the instruction code.

Although out-of-order processing greatly improves throughput, it also increases complexity as compared to simple sequential processors. One area of increased complexity relates to state recovery following an unpredicted change of instruction flow. At any time during execution many instructions may be in the execution stage, some awaiting scheduling, some being executed, and some having completed execution but awaiting retirement. In the event that a change of instruction flow is detected during execution of an instruction, the instructions preceding that instruction must proceed to retirement, but the instructions following should be discarded. In other words, the state of the processor at the time of the change in instruction flow must be recovered in order for execution to continue properly. State recovery restores the pipeline to a state that it would have existed had the mispredicted instructions not been processed. Hence, one particular problem with superscalar processors is state recovery following an unexpected change of instruction flow caused by internal or external events such as interrupts, exceptions, and branch instructions.

Out-of-order execution can result in conflicts between instructions attempting to use the same registers even though these instructions are otherwise independent. Instructions may produce two general types of actions when executed: storing results that are directed to an architectural register location and setting condition codes (CCs) that are directed to one or more architectural condition code registers (CCRs). The results and CC's for any instruction that is speculatively executed cannot be stored in the architectural registers until all conditions prior to the instruction are resolved. To overcome this problem in prior processors, new register locations called "rename registers" are allocated for every new result produced (i.e., for every instruction that loads data into a register) in a process called "register renaming". A similar technique is used to store the CC set by a speculatively executed instruction. One difficulty with this technique is that because the speculative CC is stored separately from the speculative result, the bookkeeping logic necessary to handle the results and CC sets with precision is cumbersome and can slow processor throughput.

Using register renaming, an instruction identifying the original register for the purpose of reading its value obtains instead the value of the newly allocated rename register. Thus, the hardware renames the original register identifier in the instruction to identify the new register and the correct stored value. The same register identifier in several different instructions may access different hardware registers depending on the locations of the register references with respect to the register assignments. Although widely used, register renaming requires use of a tracking table having entries for each register in the processor indicating, among other things, the instruction identification and the particular instruction assigned to that register. This method of register renaming becomes unwieldy for larger designs with hundreds or thousands of registers. Also, because tracking tables become slower to access as they increase in size, large tracking tables may become a clock frequency limitation.

When an error occurs in the execution of a microinstruction an "exception" is generated. Typical exceptions include "faults", "traps" and "interrupts". These events cause updates of the macroarchitectural or microarchitectural state of the processor in response to the condition detected by invoking software or hardware instruction routines called "exception handlers". Exception handling is complicated in a multiple pipeline machine. Exceptions may be handled in either a precise or imprecise manner. Precise exception handling allows the programmer to know exactly where an error occurred and continue processing without having to abort the program because the appearance of sequential execution of instructions is preserved. In contrast, imprecise exception handling provides minimal information to the programmer, none of which is guaranteed to be correct, and may require aborting execution of the program. Thus, in most applications, precise exception handling is preferred.

SUMMARY OF THE INVENTION

The present invention involves a processor including at least one execution unit generating out-of-order results and out-of-order condition codes. Precise architectural state of the processor is maintained by providing a results buffer having a number of slots and providing a condition code buffer having the same number of slots as the results buffer, each slot in the condition code buffer in one-to-one correspondence with a slot in the results buffer. Each live instruction in the processor is assigned a slot in the results buffer and the condition code buffer. Each speculative result produced by the execution units is stored in the assigned slot in the results buffer. When an instruction is retired, the results for that instruction are transferred to an architectural result register and any condition codes generated by that instruction are transferred to an architectural condition code register.

The present invention involves a system and apparatus for maintaining precise architectural state primarily through structures called "result buffers" that reside in execution units. In accordance with the present invention an integer result buffer resides in an integer execution unit and a floating point result buffer resides in a floating point execution unit. Optionally, a single result buffer can be used for both integer and floating point results where a lower frequency design is acceptable. These result buffers allow instructions to store the results of speculative execution. Thus if an instruction is executed before a preceding branch outcome is known, the instruction is said to be speculative and its result is stored in either the integer or floating point result buffer. When all prior instructions have completed execution, the speculative instruction is retired and its result is committed to the architectural register file by the instruction retirement unit.

The integer and floating point buffers store not only the results that would have been committed to the integer and floating point registers but also store additional bits of state that correspond to integer and floating point condition codes (CCs). The integer and floating point condition code registers (CCRs) are also updated at retirement of the instruction.

If the speculative instruction arises from a branch misprediction, the retirement unit would never get to retiring the speculative instruction since the machine would have been flushed upon detection of the branch mispredict. Likewise, if an older instruction trapped, the results of the younger speculative instruction are not committed to architectural registers because the machine would have been flushed on retirement of the trapping instruction.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

Figure 1:
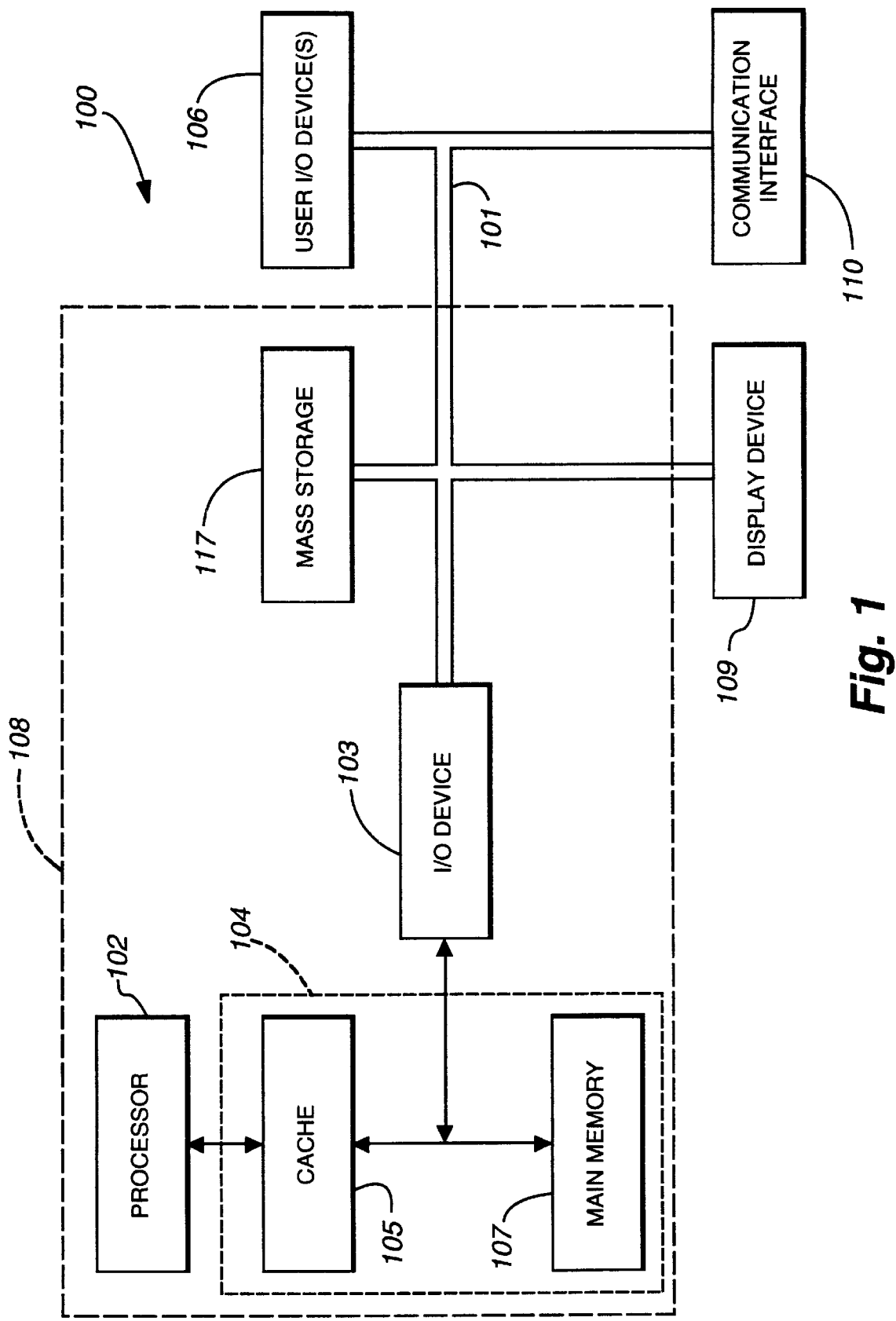
FIG. 1 shows in block diagram form a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
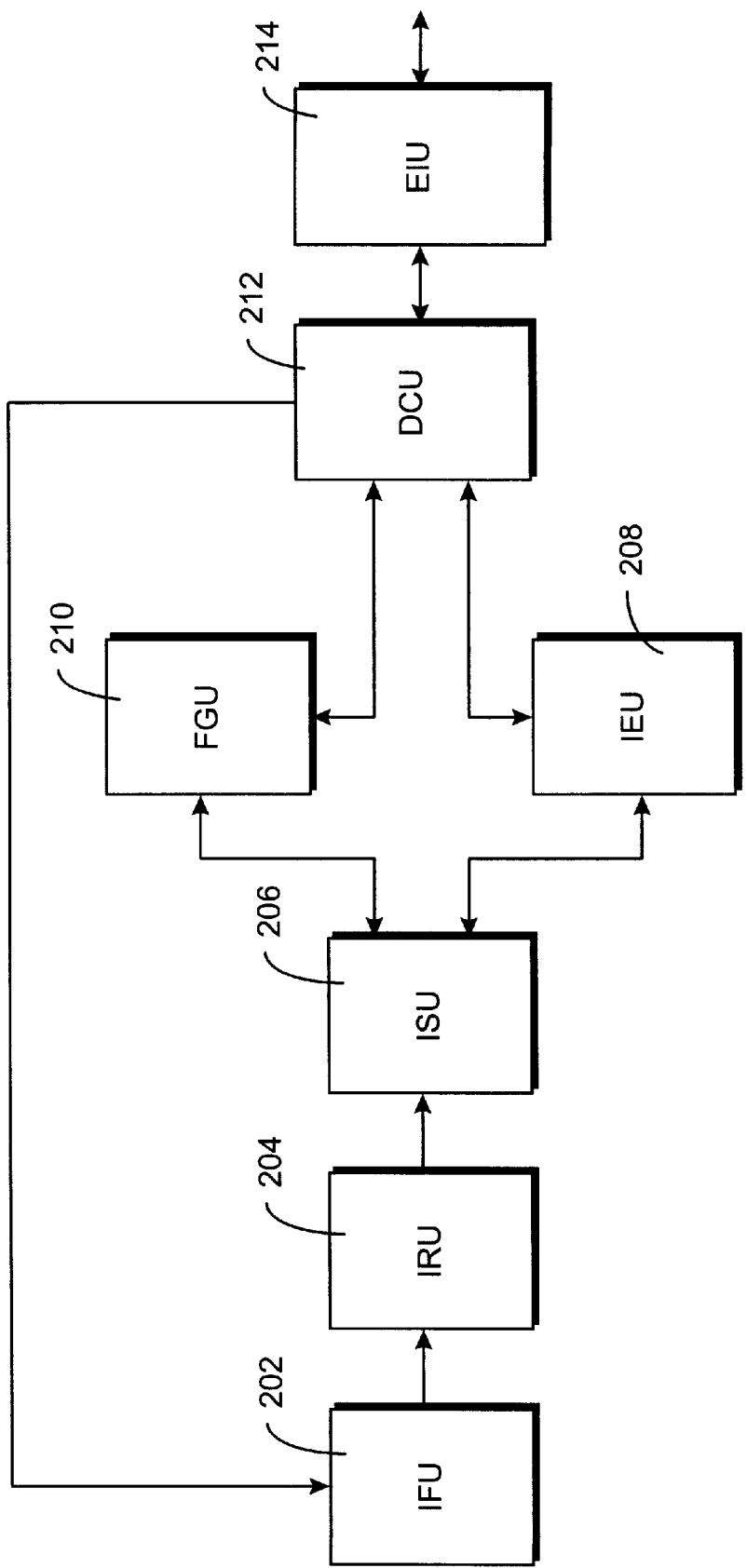
FIG. 2 shows a processor in block diagram form incorporating the apparatus and method in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing the instruction cache. The instruction cache feeds addressed instructions to instruction rename unit (IRU) 204. Preferably, IFU 202 fetches multiple instructions each cycle and in a specific example fetches eight instructions each cycle.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched from the instruction cache but has not yet completed or been retired. IRU 204 is described in greater detail with reference to FIG. 3. IRU 204 outputs renamed instructions to instruction scheduling unit (ISU) 206.

Program code may contain complex instructions, also called "macroinstructions", from the running object code. It is desirable in many applications to break these complex instructions into a plurality of simple instructions or "microinstructions" to simplify and expedite execution. In a specific implementation, the execution units are optimized to precisely handle instructions with a limited number of dependencies using a limited number of resources (i.e., registers). Complex instructions include any instructions that require more than the limited number of resources or involve more than the limited number of dependencies. IRU 204 includes mechanisms to translate or explode complex instructions into a plurality of microinstructions. These microinstructions are executed more efficiently in the execution units (e.g., floating point and graphics execution unit (FGU) 210 and integer execution unit (IEU) 214208 than could the macroinstructions.

ISU 206 receives renamed instructions from IRU 204 and registers them for execution. Upon registration, instructions are deemed "live instructions" in a specific example. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions. Operand bypassing is also referred to a "forwarding" and is a technique whereby the operands are not obtained from a register file but are instead the results of older instructions that are "in flight" (i.e., other live instructions) IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units and to determine operand bypassing amongst instructions. In the specific example, FGU 210 includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used. FGU 210 preferably includes mechanisms to access single and/or double precision architectural registers as well as single and/or double precision rename registers.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

Figure 3:
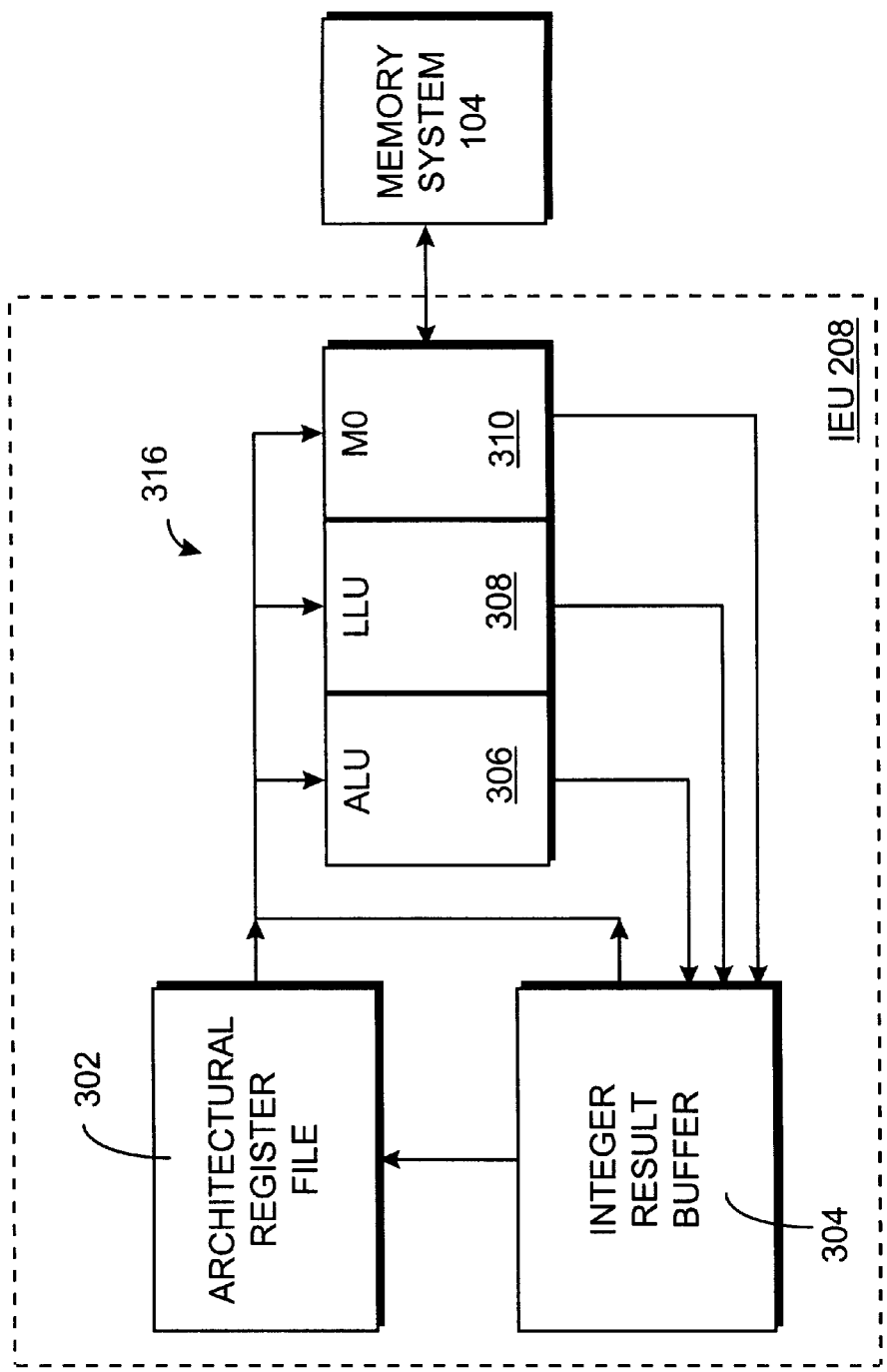
FIG. 3 illustrates an integer execution unit in accordance with an embodiment of the present invention.

The apparatus and method for precise architectural update in accordance with the present invention is implemented primarily in the execution units (i.e., IEU 208 and FGU 210). As shown in FIG. 3, IEU 208 includes an architectural register file 302 having a number of individual registers for the exclusive use of IEU 208. In the specific implementation, integer architectural register file 302 contains or comprises 160 registers and may comprise additional scratch registers. In a particular implementation the 160 registers are organized in four sets of global registers and eight sets of windowed registers. At any given time 32 registers are available in, for example, a SPARC-V9 architecture specification. The 32 register window is moved to 16 registers down the stack during a function call so that the upper and lower eight registers are shared between functions, to pass and return values, and eight are local. The window is moved up on return, so registers are loaded or saved only at the top or the bottom of the register stack. This allows functions to be called in as little as one cycle. The register stack making up architectural register file 302 can be expanded, for example, up to 512 registers or 32 windows to reduce loads and saves between functions. Likewise, architectural register file 302 can be scaled down to reduce, interrupt or context switch time, when the entire register set has to be saved. Function calls are typically much more frequent than interrupts, so the large register set is usually beneficial, but compilers are known that can produce code which uses a fixed register set as efficiently as a windowed register set across function calls.

IEU 208 comprises one or more pipelines 316 each of which provide specific functionality and handle specific types of instructions such as arithmetic logic unit 306, long latency unit 308, and memory unit 310. ALU 306, for example, may itself comprise multiple arithmetic logic pipelines or execution units. LLU 308 in accordance with the specific embodiment is specifically adapted for handling instructions that require long latency or multiples cycles to complete. In contrast, ALU 306 is adapted to instructions that can be executed in a single cycle.

Memory unit 310 which may be identified as a separate subsystem or functional unit in many processor architectures, interfaces with memory system 104 to perform load and store operations. Memory unit 310 is advantageously implemented with IEU 208 because the addresses used in load/store operations are typically defined to require an integer calculation by ALU 306 to generate memory addresses for memory unit 310. Execution pipelines 316 receive instructions and operands from architecture register file 302 and are integer result buffer 304 (depending on which unit contains the most recent data) and provide results to integer result buffer 304. Execution pipelines 316 operate in parallel and the result produced include results of integer calculations, memory accesses, and condition codes.

In one implementation, IEU 208 includes a second bank of execution units 316 (not shown) to increase instructions per cycle (IPC) of processor 102. In this implementation, memory system 104 maintains two mirrored copies of the L1 data cache so that the second bank can access memory simultaneously with execution units in the first bank. These and similar modifications are primarily matters of device scaling and do not substantially affect the operation of integer result buffer 304 in accordance with the present invention.

Pipelines 316 produce a plurality of results including computational results (i.e., coded integer values), condition codes, and memory access results. From an architectural standpoint, these results are intended to be stored in an instruction-specified register in architectural register file 302. Each instruction executed in execution pipelines 316 includes a destination register (RD) specifier encoded with the instruction. RD identifies particular architectural register or registers in architectural register file 302 that should receive the results. However, in an out-of-order processor, the results, including condition codes and memory accesses generated by execution pipelines 316 are speculative until all predicate branch conditions have been resolved. When a branch prediction is made correctly, the speculative results can then be stored or committed to the specified architectural register file. During the time between execution and commitment, integer results buffer 304 stores the speculative results.

Integer results buffer 304 is akin to a register rename buffer used in prior devices. Unlike conventional register rename buffer, integer result buffer 304 includes an entry or "slot" for each "live instruction" in processor 102. Each slot in integer result buffer 304 includes a first field for storing a speculative integer computation result and a second field for storing speculative condition codes. Integer result buffer 304 may be physically implemented as two separate registers to speed access time, however, an important feature in accordance with the present invention is that the condition code portion has a one-to-one correspondence with the integer computation result portion of the integer result buffer 304.

In a particular implementation, processor 102 can support up to 128 live instructions at any given time. This number is somewhat arbitrary and is selected to meet the needs of a particular application. But in the specific example, integer result buffer 304 would include 128 slots with each slot having a field for integer computation results and condition codes. This implementation allows a potential for all 128 live instructions to be integer instructions that produce both results and condition codes. It will be appreciated that integer result buffer 304 is thus much larger than necessary because it is unlikely that any typical program code would result in 100% integer instructions each of which generate both results and conditions. However, by sizing integer result buffer 304 in this manner, it is ensured that integer result buffer 304 will always be able to handle its required load.

By providing one-to-one correspondence between condition code fields and computation result fields, bookkeeping logic and access to integer results buffer 304 is greatly simplified. As soon retirement logic and instruction scheduling unit 206 determines that an instruction is to be retired (or flushed) integer result buffer 304 can simply access the slot corresponding to the retiring instruction and transfer that data to architectural register file 302. Similarly, condition codes for each retiring slot can be transferred from integer result buffer 304 to an architectural condition code file (shown a FIG. 5). Unlike conventional rename register implementations that require mapping renamed registers to architectural registers, no complex mapping is required in accordance with the present invention. For example, of the 128 live instructions in this specific example, perhaps instruction 35 has been identified for retirement (i.e., all predicate branches instructions have been resolved). It is a simple matter to access slot 35 in IRB 304 to transfer to the appropriate architectural register file registers in architectural register file 302. This simplicity of bookkeeping greatly simplifies the logic and speeds processing.

Figure 4:
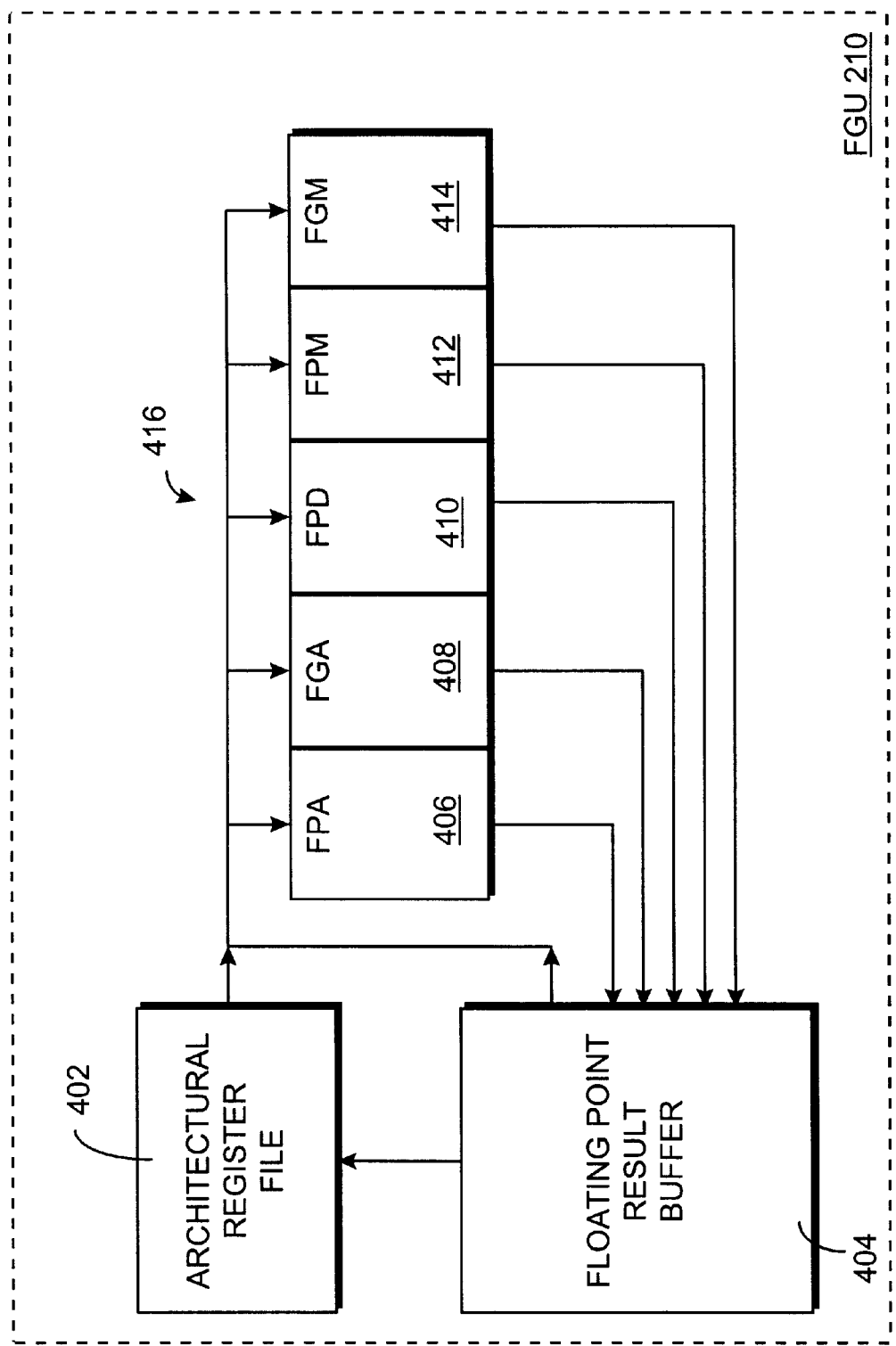
FIG. 4 shows a floating point/graphics execution unit in accordance with the present invention.

FIG. 4 illustrates an exemplary floating point and graphics unit 210 in accordance with the present invention. Like the integer execution unit, FGU 210 preferably comprises a plurality of pipelined execution units 416. In general the execution units in pipelines 416 are specifically adapted to process floating point and graphic instructions and share common register resources in architectural register file 402. Example execution units include a floating point adder 406, floating point graphics adder 408, a floating point divider 410, a floating point multiplier 412, and a floating point graphics multiplier 414. The exact choice of pipeline circuitry and the number of execution units within each pipeline is a matter of design choice to be selected based on the type of instructions expected to be executed on processor 210.

Execution pipelines 416 obtain operands from architectural register file 402 or floating point result buffer 404 depending on which unit has correct data as determined by control circuitry (not shown) Execution pipelines 416 generate floating point results some of which are speculative results. As discussed hereinbefore, speculative results are results generated from unresolved conditional branch instructions.

In a preferred implementation floating point result buffer 404 includes a plurality of register slots with one slot associated with each live instruction in processor 102. Floating point result buffer 404 also stores speculative condition codes generated by floating point execution units 416. Hence, each live instruction is assigned one slot in floating points buffer 404 that slot holding both results at the floating point calculation and a condition code (if any).

When a live instruction is scheduled for retirement, the corresponding slot in floating point results buffer 404 is accessed and the contents transferred to the instruction-specified results register and the instruction-specified condition code register in architectural register file 402. It should be noted that on retirement, both floating point results buffer 404 and integer result buffer 304 (shown at FIG. 3) are optionally simultaneously accessed to further simplify bookkeeping and control circuitry. In the case of an integer instruction, the assigned slot and floating point result buffer 404 will be empty and so will not alter the architectural state of processor 102. Conversely, in the case of a floating point instruction, the assigned slot in integer result buffer 304 will be empty and so retirement will not alter the architectural state of processor 102.

A significant advantage of the present invention is realized during branch recovery. When a branch is mispredicted, instructions scheduling unit 206 is operative to restore the architectural state to that which existed before the mispredicted branch was taken. The circuitry responsible for this is typically called branch recovery unit and may be located within ISU 206, or be provided as a separate functional unit in processor 102. The present invention eases operation of the branch recovery process by simplifying the process of locating rename registers and clearing the results. In accordance with the present invention, all of the live instructions generated by following a mispredicted branch tree have assigned slots in both floating point result buffer 404 and integer result buffer 303. The branch recovery circuitry simply accesses and clears the contents of each of these assigned slots thereby preventing any of the speculative results or speculative condition codes from altering the architectural state by being transferred to the architectural register files 302 and 402.

In a particular example, architectural register file 402 comprises 64 slots for registers, the exact number of which is determined by the instruction architecture for a particular processor. These 64 slots are partitioned into two 32-register partitions. In a particular example floating point register file 402 includes 16 read ports and 6 write ports. The entire 64 entry architectural register file 402 can be accessed by all pipeline units 416, however, for a particular instruction, the source registers and destination of registers specified in the instruction should come from one 32 entry section or the other of architectural register file 402 as required by the SPARC V9 instruction architecture.

Floating point result buffer comprises 128 slots in the specific embodiment corresponding to the 128 live instruction limit. Hence, the size of both integer result buffer 304 and floating point result buffer 404 is based not on an estimate of the balance between floating point/integer operations, but instead based upon the maximum number of live instructions in processor 102. Performance should not be substantially effected regardless of the mix of integer/ floating point instructions in the program code.

In accordance with the present invention, more or fewer register slots may be provided in FPU 201, but preferably there is one slot assigned to each live instruction. The floating point result buffer 404 is implemented with 22 read ports and 8 write ports in the specific embodiment. Data transfer between the first 32 register section and the second 32 register section is preferably accomplished via move instructions or through memory.

It should be noted that while IEU 208 (shown in FIG. 3) preferably accesses memory through a first level (L1) data cache, the bandwidth required for operands in FGU 210 is likely such that operands should be directly accessed from the second level (L2) cache using appropriate control circuitry. However, the present invention is applicable to a wide variety of architectures and memory design some of which may require wider bandwidth access by the integer execution unit as opposed to the floating point execution unit. These and similar modifications are considered equivalent to the particular embodiment disclosed herein.

Figure 5:
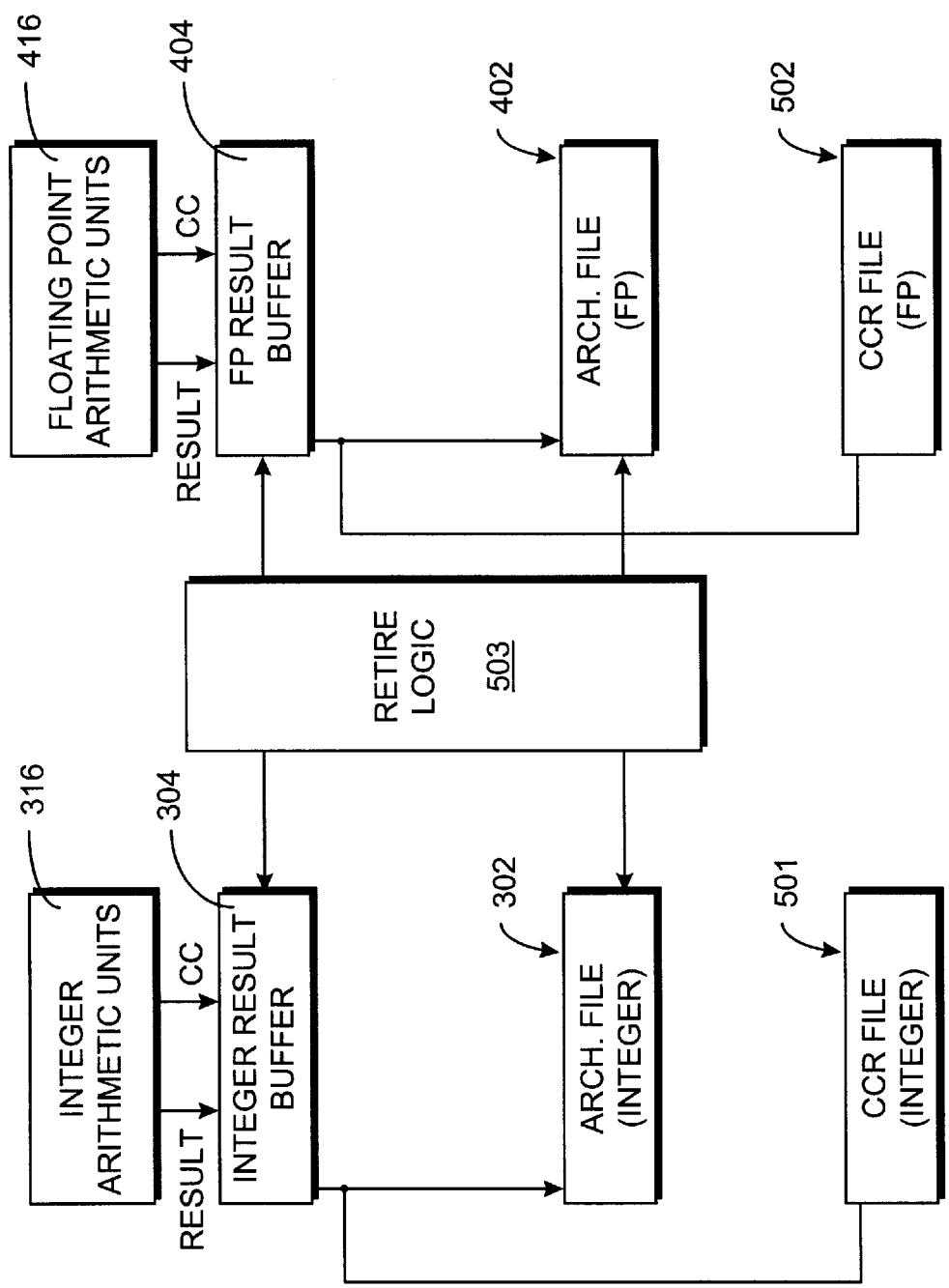
FIG. 5 illustrates a first embodiment apparatus and method in accordance with the present invention.

FIG. 5 illustrates in block diagram form major interacting functional units in accordance with the apparatus and method in accordance with the present invention. The implementation in FIG. 5 is directed towards a single processor implementation that processes either single thread application instructions or handles multi-thread processes via software or operating system modifications rather than hardware. The implementation shown in FIG. 5 is substantially similar to that described in reference to FIG. 3 and FIG. 4. In contrast, the embodiment illustrated in FIG. 6 includes modifications to account for hardware supported multi-thread operations.

Integer arithmetic units or pipelines 316 generate result and condition code values that are stored in integer result buffer 304. Simultaneously floating point arithmetic units 416 generate result and condition code values that are stored in floating point results buffer 404. Upon retirement as indicated by retire logic 503, one or more instruction slots in integer result buffer 304 transfer their results to appropriate instruction-specified architectural file 302 and instruction specified condition code register file 501. Likewise, in response to entire logic 503, specific instruction slots in floating point result buffer 404 transfer their results to instructions specified registers in architectural register file 402 and condition codes to instructions specified register locations in condition code register file 502. In the embodiment shown in FIG. 5, each result buffer 304 and 404 is associated with and supports one architectural file and one CCR file.

Figure 6:
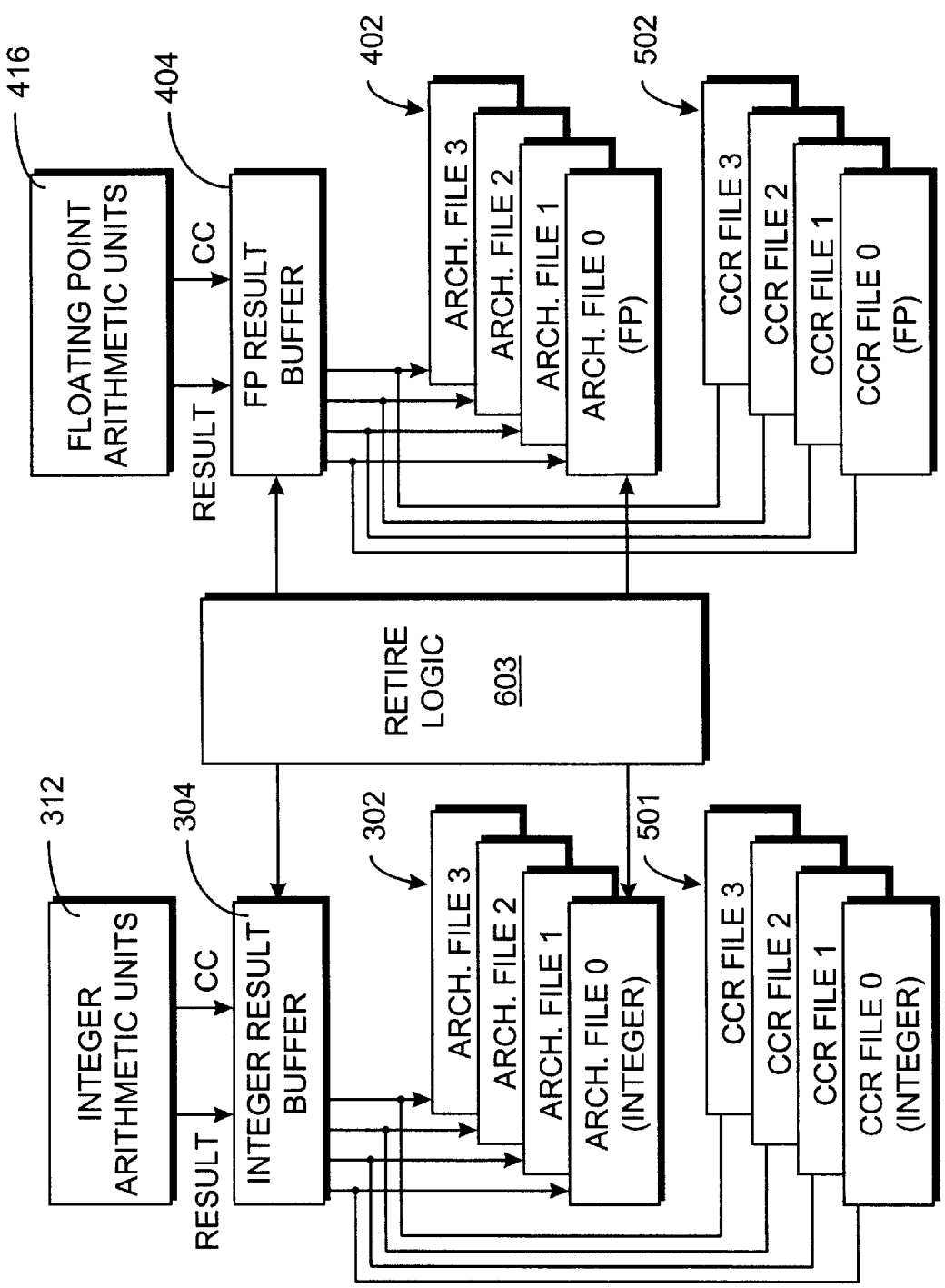
FIG. 6 illustrates a second embodiment apparatus and method in accordance with the present invention.

The present invention can be implemented in a processor having hardware support for multi-thread operation as shown in FIG. 6. In multi-thread operation multiple independent architectural files 302, 402, 501, and 502 are provided such that each architectural file is associated with and supports a single process or thread running on processor 102. Hence, architectural register file 302 is implemented as four architectural file registers identified as FILE 0, FILE 1, FILE 2 and FILE 3 in FIG. 6. The specific implementation shown in FIG. 6 includes a four processor multi-processor, but more or fewer processors may be provided depending on the needs of a particular application and the abilities of processor 102. In a configurable architecture, architectural file 302 may be partitioned in a single partition for single processor implementation and further partitioned into FILE 0–FILE 3 for multi-processor operation.

An integer architectural CCR file (labeled CCR FILE 0(INTEGER)–CCR FILE 3 in FIG. 6) as is a floating point CCR file (labeled CCR FILE 0 (FP)–CCR FILE 3 in FIG. 6) is provided for each active processor. In accordance with the present invention, a single integer result buffer can supply information to multiple architecture files to enhance performance and simplify circuitry required to support multiprocessor operation. Integer result buffer 304 operates under control of retire logic 603 in a manner similar to that described in reference to FIG. 5. Similarly, a single floating point result buffer 404 can support multiple copies of architectural files 402 and 502 in accordance with the present invention.

Optionally, floating point result buffer 404 and integer result 304 can be implemented as a single, unified result buffer having a number of slots corresponding to the number of live instructions in processor 102. While such an implementation may make more space-efficient use of silicon area, high-frequency operation is enhanced by providing separate integer result and floating point result buffers. In this way, each execution unit (e.g., IEU 208 and FGU 210) can be physically located a short distance from the associated result buffer, thereby allowing shorter signal and data lines on the chip layout. The shorter lines enable higher frequency operation.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer readable code embodied therein to perform precise architectural update in an emulated or simulated out-of-order machine. Accordingly, these and other variations are equivalent to the specific implementations and embodiments described herein.

What is claimed is:

1. A processor that executes coded instructions, the processor comprising:
    at least one execution unit generating speculative results and speculative condition codes affecting an architectural state of the processor;
    a results buffer having a number of slots, wherein each live instruction in the processor holds a slot in the results buffer;
    a condition code buffer having the same number of slots as the results buffer, each live instruction in the processor holds a slot in the condition code buffer such that each slot in the condition code buffer has a one-to-one correspondence with a slot in the results buffer;
    a plurality of speculative results produced by the execution units in response to a live instruction, wherein each speculative result is stored in a unique slot in the results buffer;
    a plurality of speculative condition codes produced by the execution units each stored a unique slot in the condition code buffer; and
    a retirement device determining which slots in the results buffer and condition code buffer are no longer dependent on an unresolved branch and transferring the results in the non-speculative slot to an architectural results register and transferring the condition code in the non-speculative slot to an architectural condition code register.

2. The processor of claim 1 wherein each of the at least one execution units comprises a results buffer and a condition code buffer.

3. The processor of claim 1 wherein the retirement device further comprises flushing circuitry operative to empty slots storing results that are dependent upon a mispredicted branch.

4. The processor of claim 1 wherein the at least one execution unit further comprises:
    an integer execution unit; and
    a floating point execution unit.

5. The processor of claim 1 wherein each of the at least one execution units comprises multiple execution pipelines.

6. The processor of claim 1 wherein the number of slots in the results buffer is equal to a maximum number of live instructions within the processor.

7. The processor of claim 1, wherein the processor executes coded instructions from multiple threads:
    a plurality of architectural results registers, each architectural results register associated with one of the multiple threads;
    a plurality of architectural condition code registers, each condition code register associated with one of the multiple threads;
    wherein the retirement device selects one of the architectural results registers and one of the architectural condition code registers for transferring based upon which thread produced the speculative result and speculative condition code.

8. A processor that executes coded instructions, each instruction specifying an architectural results register destined to receive results of the instruction execution, the processor comprising:
    at least one execution unit generating results affecting an architectural state of the processor;
    a first results buffer having a number of slots, wherein each live instruction in the processor is assigned a slot in the first results buffer in a manner that retains an association between the live instruction, the architectural results register specified by the live instruction, and the assigned slot;
    a result produced by the at least one execution unit in response to execution of a live instruction, wherein the result is stored the slot assigned to the executed instruction in the first results buffer;
    a retirement device identifying which slots in the results buffer are no longer dependent on an unresolved branch and transferring the results in identified slots to architectural results registers specified by the live instructions associated with the identified slots.

9. The processor of claim 8 wherein the number of slots is independent of a portion of the instructions that generate results.

10. The processor of claim 8 further comprising:
    at least two execution units;
    a second results buffer having a number of slots, wherein each live instruction in the processor holds a slot in both the first results buffer and the second results buffer.

* * * * *